Jan. 7, 1936.  E. F. W. ALEXANDERSON  2,027,140

TORQUE AMPLIFYING SYSTEM

Filed Nov. 2, 1932  2 Sheets-Sheet 1

Inventor:
Ernst F. W. Alexanderson,
by Charles␣␣␣␣␣
His Attorney.

Jan. 7, 1936.  E. F. W. ALEXANDERSON  2,027,140

TORQUE AMPLIFYING SYSTEM

Filed Nov. 2, 1932  2 Sheets-Sheet 2

Inventor:
Ernst F. W. Alexanderson,
by Charles E. Mullan
His Attorney.

Patented Jan. 7, 1936

2,027,140

UNITED STATES PATENT OFFICE 2,027,140

TORQUE AMPLIFYING SYSTEM

Ernst F. W. Alexanderson, Schenectady, N. Y., assignor to General Electric Company, a corporation of New York Application November 2, 1932, Serial No. 640,874

10 Claims. (Cl. 172—239)

This invention relates to torque amplifying control systems; more particularly to systems in which a load body is caused to reproduce the movements of a pilot or controlling object, and it has for an object the provision of a simple, reliable and efficient system of this character. More specifically the invention relates to systems in which a heavy load or object is caused to move in response to very minute controlling forces and to follow very small movements of the controlling object, and a further object of this invention is the provision of a very sensitive and accurate system of this character.

In carrying the invention into effect in one form thereof, the load is driven by a suitable driving means supplied from electric valve apparatus, and a reactance bridge having a movable control member is provided for controlling the electric valve apparatus. Preferably, the driving means is an electric motor and the reactance bridge is connected to the grid control circuit of the electric valve apparatus so that a very small movement of the control member of the bridge controls the direction and magnitude of the current supplied to the motor.

In illustrating the invention, it is shown as embodied in a system for reproducing an indication and also in systems for stabilizing moving objects, such for example as ships and lights mounted on unstable platforms.

Figure 1:
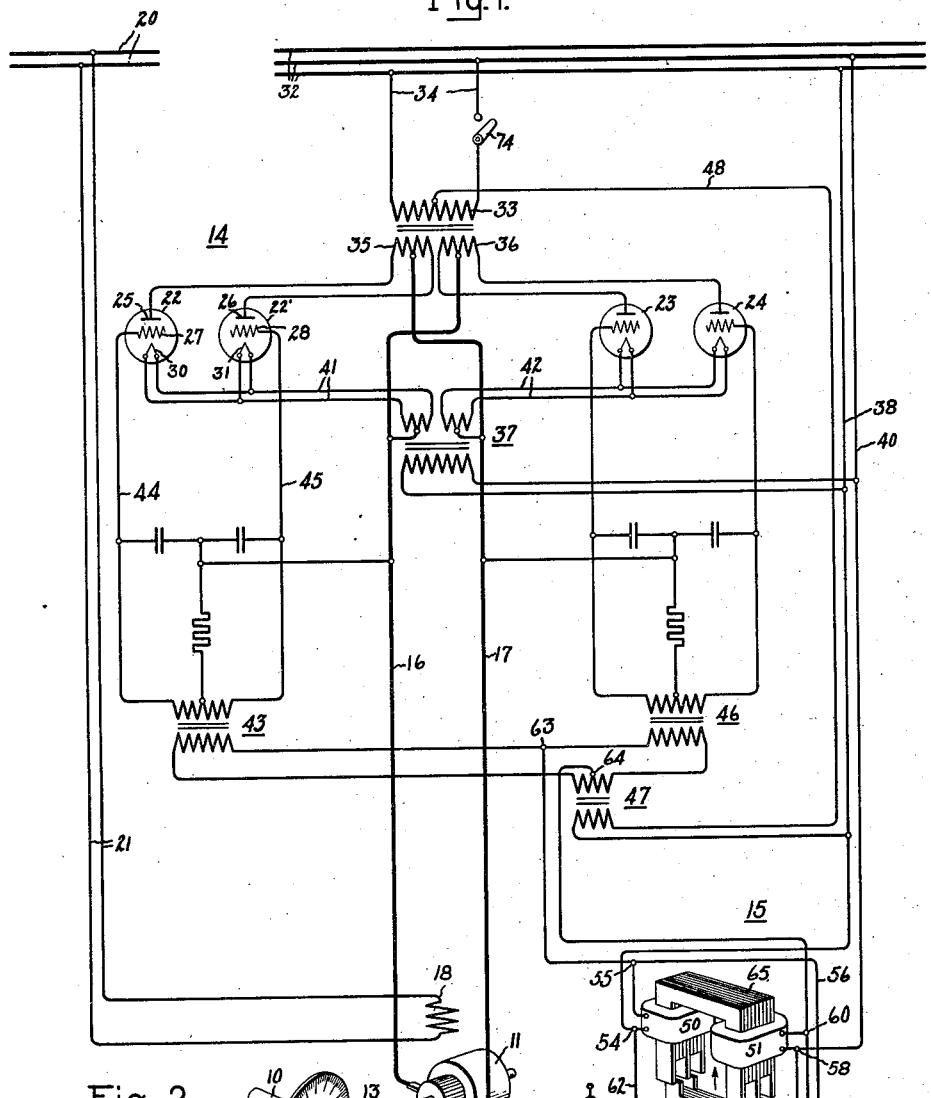
Figure 2:
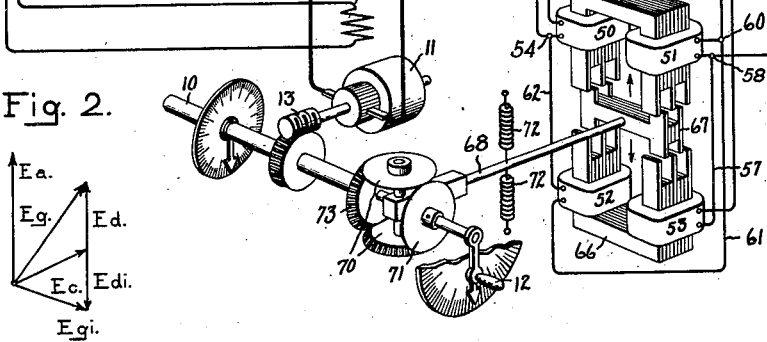
Figure 3:
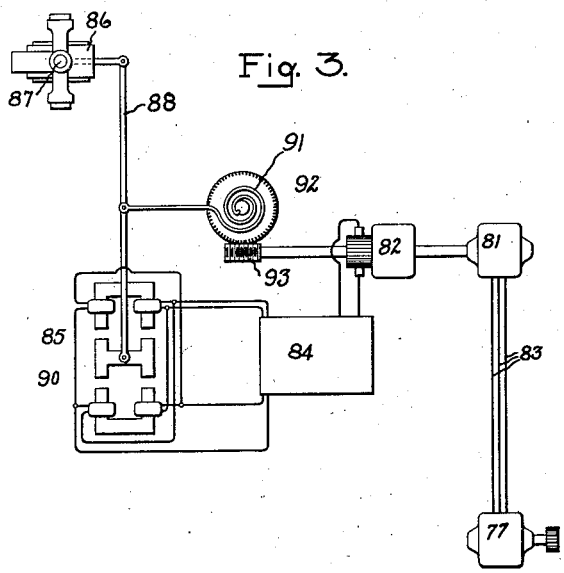

For a better and more complete understanding of the invention, reference should now be had to the following specification and to the accompanying drawings in which Fig. 1 is a simple diagrammatical sketch of an embodiment of the invention; Fig. 2 is a vector diagram serving to aid the explanation of the operation of the invention; and Fig. 3 is a modification.

Referring now to the drawings, a load body (not shown) is suitably connected to the shaft 10 and is driven by suitable driving means illustrated as an electric motor 11 to reproduce the movement of a pilot or controlling object illustrated as a handwheel 12 in response to the application of very small and minute forces. The load may be any desired load such, for example, as a large electrical motion transmitting device utilized to transmit indications to a plurality of receiving stations responsively to actuation of the pilot device.

As shown, the drive shaft 10 is connected to the drive shaft of the electric motor 11 by means of suitable driving connections illustrated as worm gearing 13. Current is supplied to the armature of the motor 11 from suitable electric valve apparatus 14 under the control of a reactance device 15 illustrated as a reactance bridge, the magnetic balance of which in turn is controlled by the pilot device 12.

The electric motor 11 is illustrated as a direct-current type motor provided with an armature member which receives direct current from the electric valve apparatus 14 to the output circuit of which the armature terminals are connected by means of the conductors 16 and 17 and also provided with a direct-current field winding 18 to which direct current is supplied from any suitable direct-current source such, for example, as that represented in the drawings by the two supply lines 20 to which the field winding terminals are connected by means of the conductors 21.

The electric valve apparatus 14 is illustrated as comprising a pair of electric valves 22 and 22' for supplying direct current in one direction to the motor 11 to effect rotation thereof in a given direction and a second pair of electric valves 23, 24 for supplying current in the opposite direction of the motor 11 to effect rotation thereof in the reverse direction.

Although the electric valves may be of any suitable type they are preferably of the three electrode vapor electric type and, as shown, the pair of valves 22, 22' are respectively provided with plates or anodes 25 and 26, control grids 27 and 28 and cathodes 30 and 31. The pair of valves 23 and 24 are provided with similar elements as illustrated. As is well understood, the average value of the current flowing in the output circuit of vapor electric valves is controlled as desired by varying the instant during each positive half cycle of the anode voltage at which the discharge is initiated. This may be accomplished in any suitable manner, but is preferably accomplished by varying the phase relationship between the voltages applied to the grids and to the anodes.

Alternating voltage is supplied to the anodes of the electric valve apparatus from any suitable source of alternating voltage such, for example, as that represented in the drawings by the three supply lines 32 by means of a suitable transformer, the primary winding 33 of which is connected by means of conductors 34 to the middle and lower sides of the supply source 32 and to the opposite terminals of one portion 35 of the secondary of which transformer, the anodes 25 and 26 of electric valves 22 and 22' are connected for full-wave rectification and to the opposite terminals of a second portion 36 of the secondary winding of which transformer the anodes of electric valves 23 and 24 are similarly connected for full-wave rectification.

The voltage applied to the anodes of the electric valve apparatus is represented vectorially in Fig. 2 by the vector $E_a$. The cathodes 30 and 31 of electric valves 22 and 22' are illustrated as of the filamentary type and are heated to the required degree of incandescence by electric current supplied thereto by means of a filament transformer 37, the primary winding of which is connected to the middle and lower lines of the supply source 32 by means of conductors 38 and 40 and the two sections of the secondary winding of which transformer are respectively connected to the cathodes 30 and 31 by means of conductors 41 and to the cathodes of electric valves 23 and 24 by means of conductors 42 as illustrated.

The grids 27 and 28 of electric valves 22 and 22' are supplied with alternating voltage by means of a grid transformer 43, the opposite terminals of the secondary winding of which are respectively connected by means of conductors 44 and 45 to the grids 27 and 28 and alternating voltage is similarly supplied to the grids of the electric valves 23 and 24 by means of a grid transformer 46, the opposite terminals of the secondary winding of which are similarly respectively connected to the grids of these valves as illustrated. The primary windings of the grid transformers 43 and 46 are connected in series relationship with each other and with the secondary winding of the step-up grid bias transformer 47, the opposite terminals of the primary winding of which are respectively connected to the lower side of the supply source 32 by means of conductor 38 and to a mid-tap of the primary winding 33 of the anode transformer by means of a conductor 48. The connection of one terminal of the grid bias transformer 47 to the mid-tap of the primary winding 33 of the anode supply transformer is made for the purpose of providing an initial phase displacement between the voltages applied to the grids and anodes of the electric valves as illustrated vectorially in Fig. 2, in which the vector $E_c$ represents the bias voltage supplied to the grids by the grid bias transformer 47 and in which the angle between the vectors $E_a$ and $E_c$ represents the phase angle between these voltages. When the grid voltage is substantially in phase with the anode voltage, maximum current flows in the output circuit of the electric valves, whilst when the grid voltage is in excess of 90° lagging with respect to the anode voltage, substantially zero current flows in the output circuit. For intermediate phase relationships, the current in the output circuit has corresponding intermediate values. In order to vary the phase relationship between the grid and anode voltages, a component voltage of variable magnitude and reversible polarity is supplied to the grids of the electric valve apparatus by means of the reactance bridge 15.

As shown, this bridge comprises a pair of reactance windings 50 and 51 constituting respectively opposite arms of the bridge and a second pair of reactance windings 52 and 53 constituting the other pair of opposite arms of the bridge. The bridge circuit is traced as follows: From the bridge point 54 through the reactance coil 50, bridge point 55, conductor 56, reactance coil 53, conductor 57, bridge point 58, reactance coil 51, bridge point 60, conductor 61, the reactance coil 52, and thence by conductor 62 to bridge point 54. It will thus be seen that the points 54 and 58 constitute respectively opposite points of the bridge and that the points 55 and 60 similarly constitute opposite points of the bridge. The first pair of bridge points 54 and 58 are respectively connected to the middle and bottom supply lines 32 by means of conductors 38 and 40 as illustrated whilst the second pair of bridge points 55 and 60 is connected to the grid circuit of the electric valve apparatus; the point 55 being connected to a point 63 between the primary windings of the grid transformers 43 and 46 and the bridge point 60 being connected to a mid-point 64 of the secondary winding of the grid supply transformer 47. The pair of reactance windings 50 and 51 constituting opposite arms of the bridge are arranged upon a laminated core 65 which partially constitutes a magnetic circuit for these windings, whilst the pair of windings 52 and 53 is similarly arranged upon a laminated core 66 likewise partially constituting a magnetic circuit for these windings. The laminated core members 65 and 66 are arranged in spaced apart relationship and the magnetic circuit of both pairs of reactance windings is completed by a laminated armature member 67 arranged in a central position in the air gap between the cores 65 and 66 and mounted for movement in opposite directions between the cores 65 and 66 and represented by the arrows in the drawings. As shown, the cores 65 and 66 and the armature 67 have a tooth and slot construction and are so arranged that upon movement of the armature 67, its teeth pass into the slot of one or the other of the core members 65 or 66 depending upon the direction of movement of the armature.

The armature member 67 is connected to the pilot device 12 by means of a supporting rod 68 upon one extremity of which it is mounted and upon the other extremity of which is mounted the third element or output gears 70 of a mechanical differential device, the input gear 71 of which is fixedly mounted upon the shaft of the pilot device 12. Suitable means illustrated as a pair of springs 72 are provided for the purpose of centering the armature 67 in a mid-position between the cores 65 and 66. When the armature member 67 is in the mid-position in which it is illustrated, the reluctances of the magnetic circuit of the pair of coils 50 and 51 and the pair of coils 52 and 53 are equal and the bridge is magnetically balanced with the result that no voltage exists across the bridge points 55 and 60 and consequently no component voltage is supplied by the bridge to the grid circuit of the electric valve apparatus. However, when the armature 67 is moved from the mid-position toward one of the cores and away from the other; for example, toward the core 65 and away from the core 66, the reluctance of the magnetic circuit of reactance windings 50 and 51 is decreased whilst the reluctance of the magnetic circuit of reactance windings 52 and 53 is increased with the result that the bridge is magnetically unbalanced and a voltage is supplied to the grid circuit of the electric valve apparatus. The connections between the bridge and the grid circuit are so chosen that the component voltage supplied to grids 27 and 28 is vectorially represented by the vector $E_d$ substantially in phase with the anode voltage $E_a$ and the component voltage supplied to the grids of electric valves 23 and 24 is 180° out of phase therewith and is represented by the vector $E_{d1}$. The magnitude of the voltages $E_d$ and $E_{d1}$ supplied to the grid circuit by the bridge depends upon the amount of movement of the armature 67 and the resultant grid voltage, i. e., the actual voltage applied to the grids is the vectorial sum of the grid bias voltage $E_c$ supplied by the transformer 47 and the component voltage $E_d$ represented by the resultant voltage $E_g$ for the pair of valves 22, 22', and by the vector $E_{g1}$ for the other pair of valves. It will thus be seen that by increasing the magnitude of the voltage $E_d$, the resultant voltage applied to the grids of valves 22 and 22' is varied from the substantially out-of-phase position of the bias voltage $E_c$ toward the in-phase position with the vector $E_a$, thereby increasing the current supplied by the pair of valves 22, 22' to the motor 11. On the other hand as the magnitude of this component voltage $E_d$ is decreased, the resultant voltage $E_g$ is displaced toward the out-of-phase position with the anode voltage $E_a$, thereby decreasing the current supplied to the motor 11 until in the central position of the armature 67 the bridge is again balanced with the result that the component voltage $E_d$ supplied to the grid circuit by the bridge is zero and the pair of electric valves 22 and 22' is deenergized and supplies no current to the motor 11 which consequently comes to rest.

In a similar manner, when the armature 67 is moved in the opposite direction from the position in which it is illustrated, the bridge 15 is magnetically unbalanced in the opposite direction with the result that a voltage of opposite polarity appears across the bridge points 55 and 60 and the component voltages represented by the vectors $E_d$ and $E_{d1}$ are now reversed. Consequently, the resultant or actual grid voltage now represented by the vector $E_{g1}$ is moved still further toward the in-phase position with respect to the anode voltage $E_a$ of electric valves 23 and 24, thereby energizing the latter and causing them to supply current to the motor 11 in the reverse direction of that previously described and likewise causing the motor 11 to rotate in the reverse direction.

As shown, the drive shaft of the motor 11 is connected to the second element or input gear 73 of the differential device and the threading of the worm gearing 13 is such that rotation of the motor 11 and the resultant rotation of the input gear 73 causes the output gears 70 and 71 to move the shaft 68 and the armature 67 in the opposite direction from the movement which caused the rotation of the motor.

With the above understanding of the apparatus and its connection and organization in the completed system, the operation of the system itself will readily be understood from the detailed description which follows:

To place the system in operation the switch 74 in circuit with the primary winding 33 of the anode supply transformer is operated to the closed position to apply voltage to the anodes of the electric valve apparatus. The motor 11 is at rest and the armature 67 is constrained to the central position in which it is illustrated by means of the spring 72. The gear 73 of the differential device is locked against rotation by means of the worm gearing 13. Rotation of the pilot device 12 effects rotation of the input gear 71 of the differential device and consequent rotation of the output gears 70 about the longitudinal axis of the shaft 10 thereby moving the armature 67 in a direction dependent upon the direction of rotation of the pilot device 12; for example, toward the core 65. As previously explained, the movement of the armature 67 towards the core 65 results in energization of the electric valves 22 and 22' which supply current to the motor 11 in such a direction as to cause the shaft 10 to rotate in a direction and by an amount dependent upon the direction and amount of movement of the pilot device 12. Rotation of the shaft 10, however, effects rotation of the input gear 73 in such a direction as to cause the armature 67 to be returned to the central position, rebalance the bridge 15 and thereby deenergize the valves 22 and 22' and stop the motor 11 at the instant that the rotation of the shaft 10 is the desired amount with respect to the controlling movement of the pilot device 12. Similarly, rotation of the pilot device 12 in the opposite direction effects movement of the armature 67 toward the core 66 thereby unbalancing the bridge in the reverse direction, energizing the electric valves 23 and 24 to supply current to the motor 11 in the reverse direction and thereby effecting rotation of the latter in the reverse direction. This reverse rotation of the motor 11 acts through the differential gearing to return the armature 67 to the central position in which the bridge is balanced, and the valves 23, 24 and the motor 11 are deenergized when the rotation of the motor is the desired amount with respect to the control system of the pilot device 12.

It will thus be seen that the differential connection between the pilot device, the armature 67 and the motor 11 acts as a follow-up so that the rotation of the motor and the movement of the load driven thereby follow very closely the controlling movement of the pilot device 12 and deenergize the motor when the desired amount of movement of the control of the load has been effected. This arrangement is extremely sensitive and accurate and it has been determined that even as slight a movement of the armature member 67 as 1/1000 of an inch from is central position causes one or the other of the pairs of electric valves to be energized and causes the motor to move the load by a proportional amount. The system is also extremely sensitive in that pressure applied to the pilot device 12 by the finger tip is sufficient to move the armature 67 and initiate operation of the system.

In the modified form shown in Fig. 3, the motor 77 is supplied with alternating current from a suitable source illustrated as an alternating-current generator 81, which in turn is driven by a direct-current motor 82. The generator 81 is connected to the motor 77 by means of conductors 83.

Current is supplied to the armature of the motor 82 by means of electric valve apparatus 84 under the control of a reactance or magnetic bridge 85 in all respects identical with the electric valve apparatus and magnetic bridge previously described in connection with Fig. 1.

The operation of the driving motor 77 is controlled by a suitable control device, such for example as the small gyroscope 86. The gyroscope 86 is so mounted that it has no freedom of motion about two of its axes, and has only limited motion about a third axis 87. The casing of the gyroscope is connected by means of a rod 88 to the armature member 90 of the reactance bridge 85, and motion of precession of the gyroscope in either direction is opposed by suitable resilient means 91 illustrated as a spring having one extremity attached to the connecting rod 88 and the opposite extremity connected to the shaft of a worm wheel 92 in mesh with a worm 93 mounted upon the drive shaft of the driving motor 82.

In operation the movable armature member 90 is in the mid position between the spaced apart cores of the reactance bridge when there is no precession of the gyroscope and the spring 91 serves to center the armature 90 in this midposition.

Any precession of the gyroscope 86 is transmitted through the connecting rod 88 to the armature 90 of the bridge 85, thereby moving the armature 90 in one direction or the other and energizing the electric valve apparatus 84 and the motor 82 in a manner similar to that already described in connection with Fig. 1. Rotation of the motor 82 causes the generator 81 to supply current to the motor 77 in a direction dependent upon the direction of precession of the gyroscope.

Since the drive shaft of the motor 82 is connected to the connecting rod 88 through the worm gearing 92, 93 and the spring 91, the rotation of motor 82 reacts upon the control by creating a force in the spring 91, the direction of which is opposed to the force exerted by the precession of the gyroscope 86. The motor 82 continues to run until the spring pressure counterbalances the pressure of the gyroscope.

Precession of the gyroscope 86 in the reverse direction effects movement of the armature 90 of the magnetic bridge in the reverse direction, thereby causing the motor 82, the generator 81, and the driving motor 77 to rotate in the reverse direction.

It will thus be seen that the driving motor 77 is at rest only when the pressure of the spring 91 counterbalances the pressure of the gyroscope 86. Consequently, the total rotation of motor 77 is always proportional to the precession of the gyroscope 86 and therefore when the precession ceases the gyroscope exerts no force and the spring 91 causes the armature 90 to control the electric valve apparatus 84 to bring the motor to rest.

Although in accordance with the provisions of the patent statutes, this invention is described as embodied in concrete form, it will be understood that the apparatus, connections, and modifications shown and described are merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States, is:

1. An torque amplifying system comprising an electric driving motor, supply means for said motor comprising electric valve apparatus provided with a control grid, means for supplying a voltage to said grid, means for controlling said grid voltage comprising a reactance bridge connected to said grid and provided with a core divided into two members spaced apart to provide an air gap, an armature member movably mounted in said air gap for controlling the magnetic balance of said bridge, a pilot device for moving said armature to unbalance said bridge and a connection from said motor to said armature for returning said armature member to its initial position to balance said bridge.

2. A follow-up system in which an object is driven into positional agreement with a pilot device comprising an electric driving motor for said driven object, supply means for said motor comprising electric valve apparatus provided with a control grid, means for supplying a voltage to said grid, control means for said electric valve apparatus comprising a reactance bridge connected to said grid and provided with a pair of core members spaced apart to provide an air gap and with a movable armature member mounted in said air gap for controlling the polarity of the voltage across said bridge, a connection from said pilot device to said armature for effecting movement of said armature to unbalance said bridge in response to movement of said device thereby to energize said motor, and a connection from said motor to said armature for returning said armature to its initial position to balance said bridge and deenergize said motor after rotation thereof proportional to the movement of said pilot device.

3. A torque amplifying system comprising in combination an electric driving motor, electric valve apparatus comprising at least two electric valves for supplying current to said motor in respectively opposite directions, each of said valves being provided with a control grid, means for supplying a voltage to said grids, and means for controlling the polarity of said grid voltage comprising a plurality of reactance windings connected to form a bridge having opposite terminals connected to said grids so that voltages of respectively opposite polarities are applied to said grids, at least two of said windings being arranged in spaced apart relationship, an armature arranged in the space between said windings and biased to a predetermined position in which said valves and said motor are deenergized and means for moving said armature in respectively opposite directions from said predetermined position to effect reversal of the polarities of said grid voltages to selectively energize said valves to effect rotation of said motor in a direction dependent upon the direction of movement of said armature.

4. A torque amplifying system comprising in combination an electric driving motor, electric valve apparatus comprising at least two electric valves each provided with a control grid for supplying current to said motor in respectively opposite directions, means for supplying voltage to said grids, means for controlling the magnitude and polarity of said grid voltages comprising a reactance bridge having opposite terminals connected to said grids so that voltages applied to said grids are of opposite polarity and having two pairs of coils, each pair provided with magnetic circuits arranged in spaced relationship and an armature member biased to a predetermined position in said space in which said bridge is balanced and said valves are deenergized and movable from said predetermined position to produce a voltage across said bridge and energize one of said valves, means for moving said armature in opposite directions from said predetermined position to selectively energize said valves to effect rotation of said motor in a direction dependent upon the direction of movement of said armature and means operable in accordance with the rotation of said motor for returning said armature to said predetermined position to stop said motor upon a rotation proportional to the amount of movement of said armature moving means.

5. A torque amplifying system comprising in combination, an electric driving motor, supply means for said motor comprising electric valve apparatus provided with a control grid, control means for said electric valve apparatus comprising a magnetic bridge connected to said grid and provided with a pair of magnetic members spaced apart to form an air gap, a movable armature member mounted in said air gap and biased to a predetermined position in which said valve apparatus and said motor are deenergized, means for applying a force to move said armature from said predetermined position to energize said valve apparatus and effect rotation of said motor, and means operated by said motor for opposing said force and returning said armature to said predetermined position to deenergize said valve apparatus and stop said motor upon an amount of rotation of said motor dependent upon the magnitude of said force.

6. A torque amplifying system comprising in combination, an electric driving motor, supply means for said motor comprising electric valve apparatus provided with a control grid, control means for said electric valve apparatus comprising a magnetic bridge connected to said grid and provided with a pair of magnetic circuits spaced apart to form an air gap, a movable armature member mounted in said air gap and biased to a predetermined position in which said valve apparatus and said motor are deenergized, means for applying a force to move said armature from said predetermined position to energize said valve apparatus and effect rotation of said motor, and a resilient connection between said motor and said force applying means for opposing said force and returning said armature to said predetermined position to stop said motor upon a rotation proportional to the magnitude of said force.

7. A torque amplifying system comprising an electric driving motor, supply means for said motor comprising electric valve apparatus provided with a control grid, means for supplying a voltage to said grid, and voltage control means for said grid comprising a magnetic bridge supplied with voltage and connected to said grid for supplying to said grid a component voltage having a predetermined phase relation with respect to said first-mentioned voltage, and said bridge being provided with a movable armature for controlling the magnetic balance of said bridge to vary the magnitude of said component voltage and the phase relationship of the resultant grid voltage.

8. A follow-up system comprising an electric driving motor, supply means for said motor comprising electric valve apparatus provided with a control grid circuit, and a reactance bridge connected to said control circuit comprising a plurality of reactance coils, each of at least two of said coils being provided with cores arranged end to end and spaced apart, a movable armature arranged in the space between said cores for controlling the magnetic balance of said bridge, a pilot device for effecting movement of said armature to unbalance said bridge and energize said motor, and a connection from said motor to said armature for returning said armature to initial position to balance said bridge and deenergize said motor after rotation thereof proportional to the movement of said pilot device.

9. A torque amplifying system comprising an electric driving motor, supply means for said motor comprising electric valve apparatus provided with a control grid circuit and control means for said valve apparatus comprising a plurality of reactance coils connected to form a bridge and having a pair of spaced apart U-shaped complementary core members, connections from said bridge to said control circuit, a movable armature arranged in the space between said core member for controlling the balance of said bridge, a movable pilot device connected to effect movement of said armature to unbalance said bridge and energize said motor, and a connection from said motor to said armature for returning said armature to the balance position of said bridge to deenergize and stop the motor.

10. A torque amplifying system comprising an electric driving motor, supply means for said motor comprising electric valve apparatus provided with a control grid circuit, and a reactance bridge controlling said valve apparatus comprising a pair of coplanar complementary U-shaped core members arranged with their open ends adjacent each other and spaced apart to provide an air gap, a plurality of reactance coils mounted on the legs of said core members and connected to form a bridge, connections from said bridge control circuits, a movable armature arranged in said air gap for controlling the balance of said bridge, a movable control device connected to move said armature to unbalance said bridge and energize said motor, and a connection from said motor to said armature for returning said armature to balance position of said bridge thereby to deenergize said motor upon rotation proportional to the movement of said control device.

ERNST F. W. ALEXANDERSON.